Jan. 23, 1968  J. B. SEWELL  3,364,613
FLOAT DEVICE
Filed June 8, 1965  2 Sheets-Sheet 1
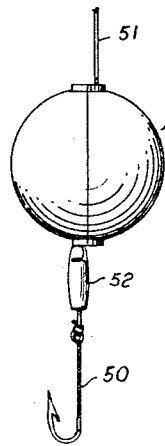
Fig. 1
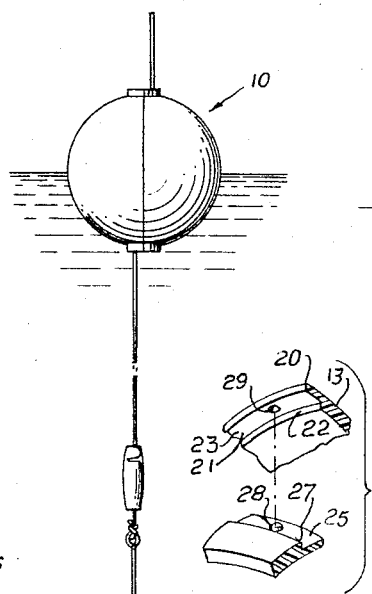
Fig. 2
Fig. 8
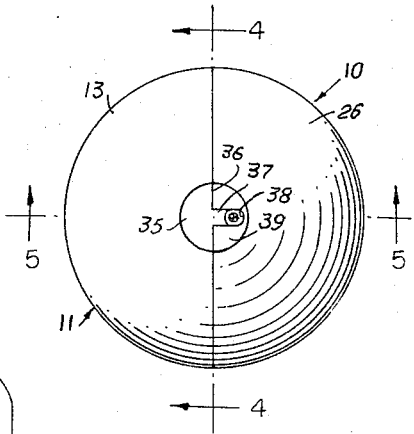
Fig. 3
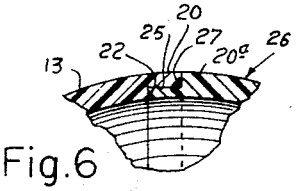
Fig. 6
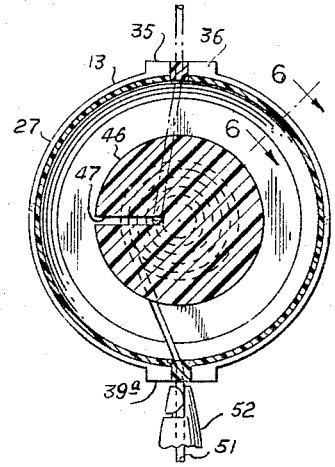
Fig. 4
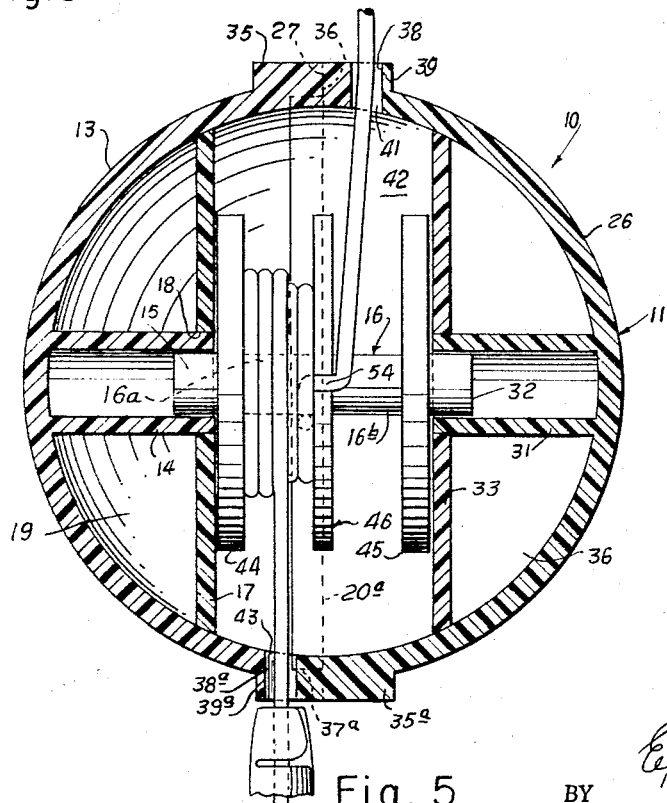
Fig. 5
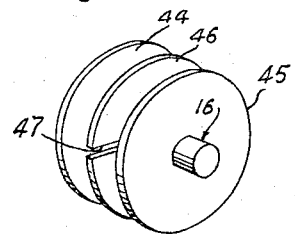
Fig. 7
INVENTOR
John B. Sewell
BY *Hastings Ackley and Walter J. Jaymes*
ATTORNEYS

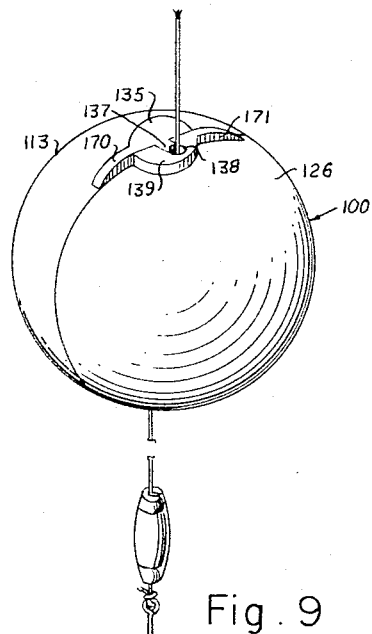
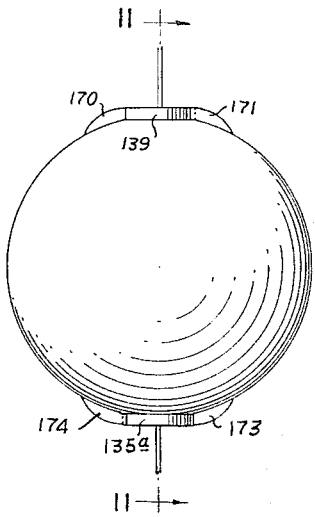
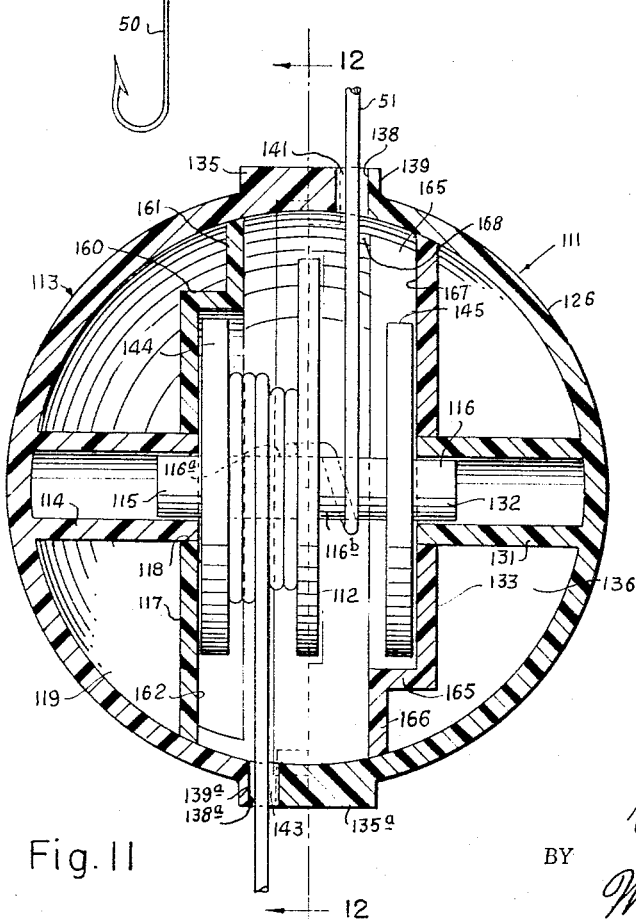
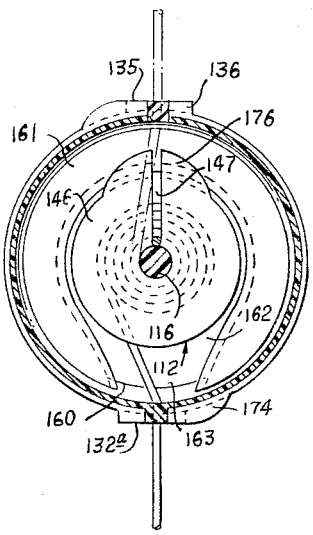

3,364,613
FLOAT DEVICE
John B. Sewell, Dallas, Tex., assignor of fifty percent to Frank E. Koudelka
Filed June 8, 1965, Ser. No. 462,209
3 Claims. (Cl. 43—43.11)

ABSTRACT OF THE DISCLOSURE

A hollow fishing float having a spool on which a portion of a fishing line below the float to which a hook is connected is wound on the spool during removal of the float from the water and unwound from the spool to position the hook a predetermined distance below the surface of the water when the float is initially placed on the water.

---

This invention relates to fishing equipment and more particularly to a float device connectable on a fishing line for supporting a hook at a predetermined depth in a body of water.

An object of this invention is to provide a new and improved float device which is easily connectable to a fishing line for supporting a hook on the end of the line at a predetermined depth below the float wherein the float device which has means for easily adjusting such depth.

Another object of the invention is to provide a fishing float which has means for holding the fish hook on the end of a line closely adjacent to the float device during the casting of the float and the hook to a desired location on the body of water and which permits the fishing hook to move downwardly from the float to a predetermined depth once the float is afloat on the water.

Still another object is to provide a new and improved device wherein the depth of which the hook is located may be easily adjusted without tying any knots in the line or cutting the line.

A further object of the invention is to provide a fishing device having a shell in which a double spool is rotatably mounted on one portion of which a portion of a predetermined length of the fishing line above the hook may be wound prior to casting which winds off the spool when the float is supported on the body of water.

A still further object is to provide a fishing float device having a shell formed of two semi-spherical sections, which are releasably securable to one another and which provide a spool chamber, and a double spool rotatably mounted in the spool chamber and having two outer discs and a central disc provided with a radial slot whereby a predetermined length of the line may be wound about the spool between the central disc and one of the outer discs, a portion of the line being received in the radial slot, the shell having bottom and top passages through which the line may extend downwardly from the spool into the water and upwardly to the fishing pole or rod and reel.

Additional objects and advantages of the invention will be readily apparent from the reading of the following description of a device constructed in accordance with the invention, and reference to the accompanying drawings thereof, wherein:

FIGURE 1 is a side view of the float device with the sinker, hook and float in the positoins for casting or thrown out to a predetermined location on a body of water;

FIGURE 2 is a view similar to FIGURE 1 showing the float device supporting the fish hook at a predetermined depth below the surface of the water;

FIGURE 3 is a top view of the float device;

FIGURE 4 is sectional view taken on line 4—4 of FIGURE 3;

FIGURE 5 is an enlarged sectional view taken on the line 5—5 of FIGURE 4;

FIGURE 6 is a sectional view taken on line 6—6 of FIGURE 4;

FIGURE 7 is a perspective view of the rotatable spool of the float device;

FIGURE 8 is a fragmentary perspective exploded view showing the means for releasably securing the two shell sections to one another;

FIGURE 9 is a perspective view of a modified form of the float device embodying the invention;

FIGURE 10 is a side view of the float device illustrated in FIGURE 9;

FIGURE 11 is an enlarged sectional view taken on line 11—11 of FIGURE 10; and,

FIGURE 12 is a reduced sectional view taken on line 12—12 of FIGURE 11.

Referring now to the drawing, the float device 10 includes a substantially spherical shell 11 and a double spool 12 rotatably mounted in the shell. The shell includes a substantially semi-spherical section 13 having a central tubular bearing portion or sleeve 14 which extends inwardly from its center and whose longitudinal axis extends through the center of the shell. The end portion 15 of the shaft of the double spool is rotatably disposed in the inner end portion of the bearing sleeve.

The planar disc or wall 17 of the section 13 has a central aperture 18 in which is disposed the free inner end portion of the bearing sleeve. The wall is rigidly secured to the bearing sleeve and the internal surfaces of the shell section by a suitable adhesive or bonding agent which seals between the wall and the shell and bearing sleeve to form a closed air chamber 19. The wall also serves to strengthen and rigidify the shell and help support the inner free end of the bearing sleeve.

The peripheral edge portion 20 of the shell section 13 is provided with an internal peripheral annular recess 21 formed by the annular surface or shoulder 22 lying in a plane perpendicular to the longitudinal axis of the bearing sleeve and an inner inwardly facing annular surface or shoulder 23 whose center of curvature lies in the longitudinal axis of the bearing sleeve. An annular peripheral flange 25 of the other shell section 26 is received in the peripheral recess. The annular shoulder 27 of the shell section 26 which extends outwardly from the peripheral flange 25 also lies in a plane perpendicular to the longitudinal axis of the bearing sleeve.

The engagement of the annular end surface of the flange 25 of the shell section 26 with the shoulder 22 of the shell section 13 and of the annular end surface of the peripheral edge portion 20 of the shell section 13 with the shoulder 27 of the shell section 26 limits telescoping movement of the annular flange 25 into the recess 21.

The annular flange 25 is provided with external bosses or protrusions 28 which are receivable in the aligned internal recesses 29 provided in the peripheral edge portion 20 of the shell section 26. The plastic substance of which the shell sections are made is somewhat resilient so that the flange 25 and the peripheral portion 20 may deform slightly to permit the protrusions to move into alignment with and into the recesses as the flange 25 is telescoped into the recess 21. The protrusion and the internal recesses thus provide a snap connection or fit between the two sections when the flange 25 is fully telescoped into the recess 21. The two shell sections are thus releasably secured together and held against accidental separation. In addition to the latching or holding action of the protrusions 28 when in the recesses 29, the outer surface of the peripheral flange 25 may be of substantially the same radius as the internal shoulder 23 of the peripheral portion 20 of the shell 13 so that the shell sections are also held together by the frictional engagement of these two surfaces or shoulders.

The shell section 26 is also of substantially semispherical configuration and has a central bearing portion or sleeve 31 integral therewith and extending inwardly to receive the other end portion 32 of the shaft 16 of the double spool. The annular wall 33 of the shell section 26 has a central aperture in which the inner end portion of the bearing sleeve is disposed. The wall 33, which is identical to the wall 17, is also rigidly secured in seal tight relationship to the shell 26 and the sleeve bearing 31 by a suitable adhesive or bonding agent which seals therebetween to provide a closed air chamber 36 in the shell section 26.

The shell section 13 has an external semi-circular boss 35 whose planar outer side surface 36 lies in the same plane as the end surface 20a of the annular peripheral edge portion 20 thereof. A tongue 37 extends outwardly of the boss and is receivable in a slot 38 of a semi-circular boss 39 of the shell section 26. The tongue 37 has an arcuate end surface which with the surfaces of the boss 39 defining the inner portions of the slot 38 defines a passage 41 which opens to the central spool chamber 42 of the shell located between the walls 17 and 33.

The shell section 26 has a boss 35a which is similar to the boss 35 of the shell section 13 and is located diametrically opposite the boss 39a thereof. The boss 35a has a tongue 37a which is receivable in the slot 38a of of a boss 39a of the shell section 13. The boss 39a is similar in configuration to the boss 39. The tongue 37a and the surfaces of the boss 39a defining the slot 38a define a passage 43 which opens to the spool chamber 42. The passages 41 and 43 open to the shell chamber at locations spaced from opposite sides of the central plane of the shell which extends perpendicularly relative to the common central longitudinal axis of the bearing sleeves 14 and 31.

The double spool 12 has a pair of outer circular discs 44 and 45 and a central disc 46. The discs of the double spool are preferably rigid and integral with the shaft 16 thereof. The central disc is provided with a radial slot 47.

In use, if it is desired that the hook 50, connected in any suitable manner to the lower end of the fishing line 51 which also has a sinker 52 connected thereto above the hook, should be located at a predetermined depth, for example ten feet, the shell sections of the float device are separated, the spool 12 is removed therefrom and a portion 54 of the line a little more than ten feet from the hook is inserted through the slot 47 and the portion of the line between the sinker and the portion 54 is then wound about the portion 16a of the shaft between the outer disc 44 and the central disc 46 of the spool. The shell sections 13 and 26 are then assembled to form the shell 11 with the spool disposed in the spool chamber 42 of the shell and with the bearing portions 15 and 32 of its shaft 16 in the bearing sleeves 14 and 32. During this assembly, the lower portion of the line immediately above the sinker is positioned in the passage 43 to extend downwardly from the spool chamber therethrough with the sinker positioned close to the bosses 35a and 39a of the shell sections 26 and 13, respectively. When the float device is now supported by the line 51, as when the upper portion of the line is lifted, the double spool will rotate in a clockwise direction (FIGURE 4) until the slot 47 is in a substantially vertical position, if the sinker is so positioned on the line that it will not engage the bosses 39a and 35a prior to the movement of the spool to this position. The spool cannot then rotate further in a clockwise direction and, since the passage 41 is spaced outwardly of the central disc, the portion 54 of the line cannot disengage from the slot 47. If the sinker is so positioned on the line that it engages the bosses 35a and 39a, as the line 51 above the float device is lifted, before the spool is rotated to the position wherein the slot 47 is in a substantially vertical position, the engagement of the sinker with these bosses will stop such rotation of the spool since it then prevents further winding of the line on the portion 16a of the spool shaft. The upper portion of the line, of course, is positioned in the passage 41 to extend upwardly from the spool chamber therethrough. The hook is then baited. The line may then be cast out, if the fishing is being done by means of a rod and reel, to a desired location and during such cast, the centrifugal force imparted to the float device will keep the portion of the line on the spool shaft portion 16a from unwinding and moving outwardly from the shell. When the float device lands in the water and a slack is provided in the fishing line above the float device, the weight of the hook, bait and sinker will now cause the spool to rotate in a counterclockwise direction (FIGURE 4) and the fishing line to unwind off the portion 16a of the spool shaft. Simultaneously, of course, upper portions of the line are wound about the portion 16b of the shaft 16 between the central disc 46 and the outer disc 45 until all of the line which has been wound on the spool shaft portion 16a unwinds. At this time, the spool can rotate no longer since such further rotation would tend to rewind the lower portion of the fishing line on the shaft portion 16a. The sinker, hook and bait are then supported by the float device which will bob if a fish now bites on the bait and imparts a downward pull on the hook. If it is then desired to lift the float device and hook from the water, as for example if a fish has been hooked, or if it is desired to cast the hook to another location or to check whether the bait is still on the hook, an upward pull is imparted to the line by means of the rod or reel. Such upward pull on the line will now cause the spool to rotate in a clockwise direction (FIGURE 4) until the line which has been wound on the portion of the shaft 16b of the shaft is unwound off the spool. Simultaneously, of course, the portion of the line below is wound again on the shaft portion 16a until the sinker again engages the boss 39a and prevents or limits further inward movement of the line into the spool chamber until the line has unwound off the shaft portion 16b and the slot 47 is moved to a substantially vertical position. A further upward pull imparted to the line will then cause the float device to be lifted from the water with the hook now positioned directly below the float device.

If the line is connected to the end of a fishing pole, the float device will operate in the same manner as described above in connection with the use of the float device on a line used with a rod and reel.

It will be apparent that the provision of the bosses at opposite ends of the shell 11 at the locations of the passages 41 and 43 where the greatest strains and stresses are imparted to the shell prevents undue wear to the shell.

It will further be apparent that since the passages 41 and 43 are spaced from the central plane of the central disc 46, the portions of the line within the spool chamber 42 do not tend to snag on the outer edges of the central disc 46 during the rotation of the spool.

It will also be seen that the air chambers 19 and 36 provide the desired buoyancy for the float device so that it will float only partially immersed in the water even though the weight of the sinker, hook, bait and the line extending therebelow may be substantial.

It will of course be apparent that the lower end portion of the line to which the hook and sinker are connected may extend outwardly of the shell through the passage 41 and the upper portions of the line extend through the passage 42 if desired.

It will also be apparent that it is very simple and easy to change depth in water at which the fishing is being done by merely separating the two shell sections and winding the desired length of line above the hook 48 onto the portion 16a of the spool to position the hook at such desired depth when the float device is afloat on the water and such length of line has unwound off the portion 16a of the spool.

The float device 100 is similar to the float 10 and, accordingly, its elements have been provided with the same reference numerals, to which the prefix "1" has been added, as the corresponding elements of the float device 10. The planar disc or wall 117 of the shell section 113 has a substantially circular flange 160 which extends perpendicularly therefrom through approximately 340 degrees and a vertical flange 161 which extends outwardly therefrom to the inner surfaces of the shell section. The disc 144 of the double spool 116 is disposed within the recess 162 defined by the perpendicular flange 160. The lower ends of the perpendicular flange 160 are disposed on opposite sides and above the passage 143 to define a vertical recess 163 which opens downwardly from the recess 162 to permit water to drain freely from the spool chamber 142 of the shell between the walls 117 and 133. In addition this downwardly open recess insures that the line 51 will not engage or rub against the vertical flange 161. The wall 133 similarly has a substantially circular perpendicular flange 165 which extends inwardly therefrom and a vertical flange 166 which extends outwardly from the inner edge of the vertical flange. The flange 165 provides an inner recess 167 in which the outer disc 145 is received. The upper ends of the flange 165 are spaced to provide a vertical recess 168 which opens upwardly from the recess 167 adjacent the passage 141 similarly to prevent engagement of the line 51 with the end flange. In the event that the position of the float device is reversed the vertical recess 168 facilitates drainage of water from the spool chamber.

The semi-circular boss 135 of the shell section 113 and the upper boss 139 of the shell section 126 are provided with finger flanges or tabs 170 and 171, one of which may be engaged by the thumb of a hand and the other by the forefinger to facilitate the separation of the two shell sections from one another by applying oppositely directed forces thereto. The lower boss 135a of the shell 126 and a lower boss 139a are provided with similar finger flanges 173 and 174, respectively, for the same purpose.

The central disc 146 of the double spool 112 is provided with an outwardly extending lobe or projection 176 through which the radial slot 147 thereof extends. The provision of the radially outwardly extending lobe 176 increases the length of the fishing line which may be wound about the portions 116a and 116b of the shaft without risk or danger that the line will disengage from the slot 147.

It will be apparent that the float device 100 functions in the same manner as the float device 10 to permit a predetermined length of the fishing line to be wound around its section 116a prior to casting or throwing out the float device which winds off the spool to position the hook 50 at a desired predetermined depth in the water when the float device is afloat.

The provision of the perpendicular and vertical flanges to the walls increases the volume of the air chambers 119 and 136 of the shell sections and thus increases the buoyance of the float device so that heavier sinkers or bait and a greater length of line are supportable by the float with only a relatively small portion of the float being submerged in the water thus increasing the visibility of the float device when it is afloat on the water.

It will be apparent that the bosses of the shell sections of the float device 10 may be provided with similar finger flanges or tabs for the same purpose as the flanges of the bosses of the shell sections of the float device 100.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A float device including: a substantially spherical shell comprising a pair of substantially semi-spherical sections, said shell providing a shell chamber, said sections having telescopical peripheral edge portions for releasably securing said sections to one another, each of said sections having wall means providing a closed air space, each of said sections having external bosses at diametrically opposed locations, one said boss having a vertical tongue extending outwardly therefrom and the other boss having a slot, the tongue of each shell section being receivable in the slot of the other section, said tongues being shorter in length than said slots whereby when said shell sections are secured to one another and said tongues are disposed in said slots, top and bottom vertical passages are provided which open into said shell chamber, said passages being located at opposite sides and spaced from the central vertical plane of said shell, said shell sections having bearing means for rotatably supporting a shaft for rotation about a horizontal axis; and a spool including a shaft whose outer portions are rotatably received in said bearing means, a pair of outer discs and a central disc disposed between and spaced from said outer discs, said discs extending perpendicularly outwardly from said shaft, said central disc having a slot extending inwardly from its peripheral edge, said wall means of each of said shell sections having a recessed portion providing an inner recess in which an outer disc of said spool is positioned and a vertical recess communicating with said inner recess, one of said vertical recesses opening downwardly adjacent one of said passages located between said one of said vertical recesses and the central vertical plane of said shell and the other of said vertical recesses opening upwardly adjacent the other of said passages located between said other of said vertical recesses and the central vertical plane of said shell.

2. The float device of claim 1; wherein said bosses of each of said sections are provided with finger flanges which extend outwardly in opposite directions relative to said tongues and slots.

3. The float device of claim 1, wherein said central disc is provided with a radially outwardly extending projection, said slot extending radially of said central disc and through said projection.

References Cited

UNITED STATES PATENTS

| 541,789 | 6/1895 | Kunzelman | 43—43.11 |
| 1,973,028 | 9/1934 | Thomas | 43—43.11 |
| 3,057,107 | 10/1962 | Finnicum | 43—43.11 |
| 3,141,256 | 7/1964 | McBriar | 43—43.11 |
| 3,169,339 | 2/1965 | Ekstrand | 43—43.11 |

SAMUEL KOREN, *Primary Examiner.*

WARNER H. CAMP, *Examiner.*